(No Model.) 2 Sheets—Sheet 1.
F. M. MAHAN & A. R. HENDRIX.
CAR STARTER AND BRAKE.
No. 359,266. Patented Mar. 15, 1887.
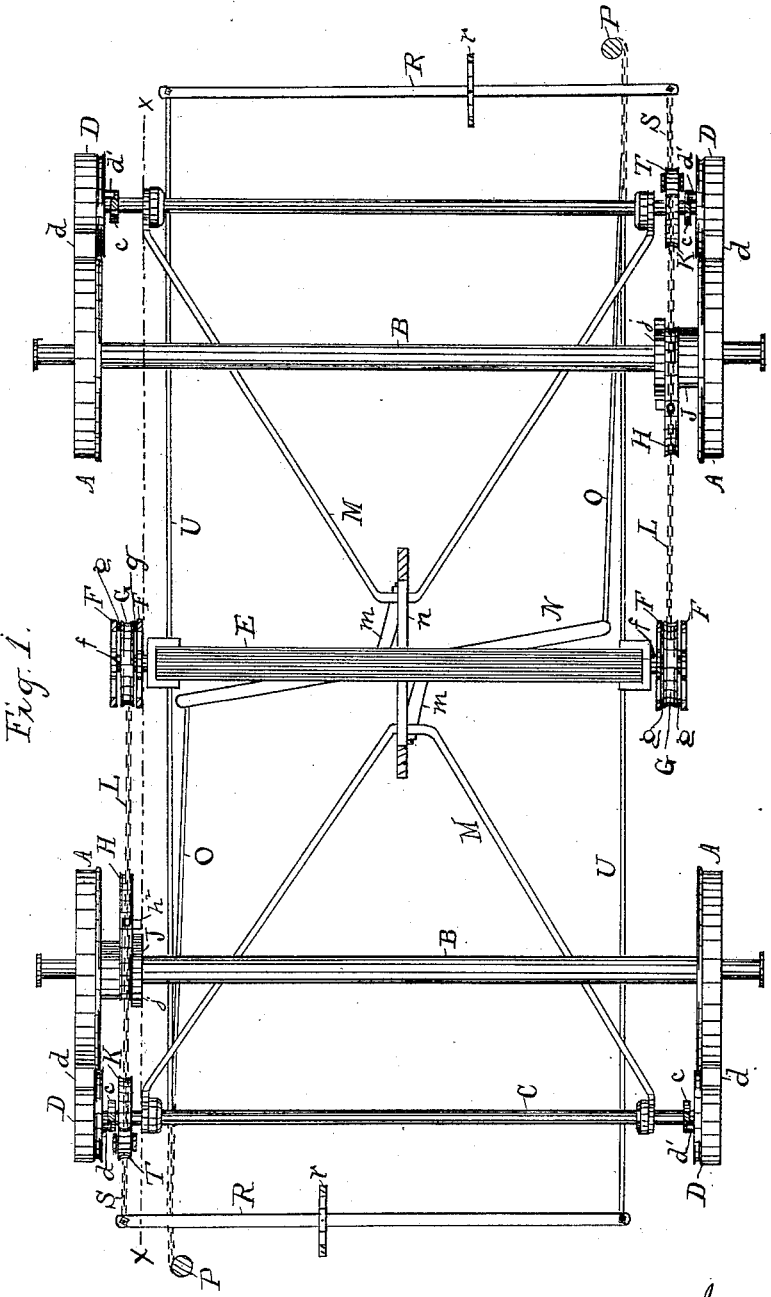
Witnesses:
E. L. Thurston
H. H. Buckley
Inventors:
Frank M. Mahan
Adam R. Hendrix
by Hill & Dixon
their attorneys (No Model.) 2 Sheets—Sheet 2.
F. M. MAHAN & A. R. HENDRIX.
CAR STARTER AND BRAKE.
No. 359,266. Patented Mar. 15, 1887.
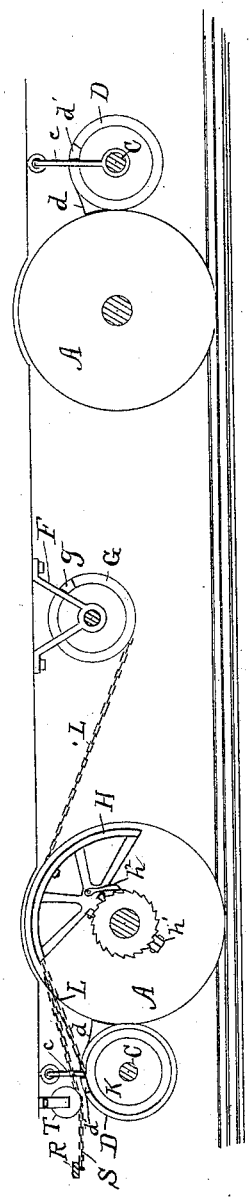
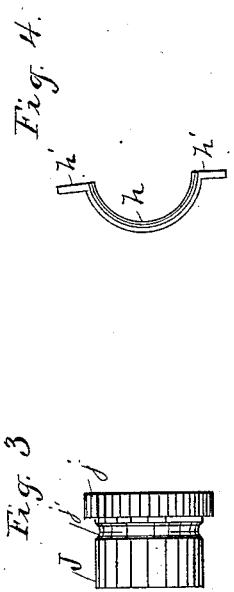

UNITED STATES PATENT OFFICE.

FRANK M. MAHAN AND ADAM R. HENDRIX, OF CHICAGO, ILLINOIS.

CAR STARTER AND BRAKE.

SPECIFICATION forming part of Letters Patent No. 359,266, dated March 15, 1887.

Application filed November 13, 1886. Serial No. 218,766. (No model.)

*To all whom it may concern:*

Be it known that we, FRANK M. MAHAN and ADAM R. HENDRIX, of Chicago, in the county of Cook and State of Illinois, have invented certain new and useful Improvements in Car Starters and Brakes, of which the following is a full, clear, and exact description, reference being had to the accompanying drawings.
Our invention is designed as an improvement on the invention described and claimed in Letters Patent No. 343,144, granted June 1, 1886, to J. W. and G. R. Strickle.

The object is to provide such means as will adapt said invention to be used on cars designed to run in both directions, and produce the effect of starting said car in either direction by the use of only one spring; also, to apply the power to twist the spring and to transmit the power to the ground-wheels in the most advantageous manner; also, to provide means whereby sufficient power may be stored in the spring to start the car, when stopped from a slow motion, which, with the old device, would not produce sufficient force to distort the spring enough.

To this end it consists, first, in connecting a single spring to revolving shafts at both ends thereof and providing means for preventing the revolution of both shafts at the same time; second, in applying a sheave-lever to the ground-wheel shaft and attaching thereto the chain which transmits the power of the friction-brake to the spring and of the spring to the ground-wheels; third, in providing means whereby the spring may be slightly twisted before the friction-brakes are applied and by means of the same brake-rod, and also in such other sub-combinations as are hereinafter described, all of which will be definitely explained, and pointed out in the claims.

In the drawings, Figure 1 is a plan view of the wheels and axles of a street-car adapted to run in either direction with our improvements applied thereto, the hangers being shown in horizontal section. Fig. 2 is a sectional elevation of the same on the line $x\,x$ in Fig. 1. Fig. 3 is a view of the ratchet-collar, which is secured to the ground-wheel shaft.
Fig. 4 is a view of one of the clasps by which the sheave-lever H is mounted on said ratchet-collar.

In the form of the invention illustrated in the drawings, A represents the ground-wheels, and B B the axles, to which they are keyed or otherwise rigidly secured. Suspended by hangers $c\,c$ on each end of the car are the shafts C. At the ends of these shafts the brake-wheels D are rigidly secured in the plane of the ground-wheels. Projecting from the periphery of the brake-wheels D, and secured thereto in any appropriate manner, are the two-faced brake-shoes $d$.

E represents the power-accumulator, which preferably consists of a number of plates of spring-steel.

Suspended from the car are the hangers F F, in which are loosely journaled the short shafts $f$. The inner ends of said shafts are bifurcated to embrace the ends of the spring, to which they are secured, so that a revolution of said shafts or either of them tends to revolve the spring. Keyed or otherwise rigidly secured to the shafts $f$ are the sheaves G, which are provided on their sides with the stops $g$. These stops prevent the sheaves G from making a full revolution by striking against the sides of the hangers F, and they are so placed that the sheaves are permitted to revolve in but one direction from the normal position, as shown in the drawings, and each sheave revolves in the opposite direction.

Loosely journaled on the axles B, at one side thereof and in the plane of the sheaves G, are the sheave-levers H. The preferable construction of said levers and their accessories is that shown in the drawings.

J represents a collar, which is rigidly secured to the axle B. This collar has at one end the ratchet $j$, and close to it an annular groove, $j'$.
$h$ represents clasps, having a semicircular central part adapted to fit into the groove $j'$ and arms $h'$ on each side thereof. When the central part of said clasps are fitted into the groove $j'$, the lower arm of the sheave-lever is inserted between two of the arms $h'$ and secured therein by bolts. The two lower arms, $h'$, are then bolted together. The pawl $h^2$ is pivoted to said sheave-lever, and is adapted to engage with the ratchet $j$.

K K represent sheaves keyed to the shaft in line with the sheave-levers H and sheaves G. A chain or cable, L, is fastened to the sheave K and at the other end to the sheave G, around which it is partly wound when in the normal position. It passes over the sheave-lever H, and is secured to said lever at about the middle point thereof by a bolt or staple.

M represents the brake-rod, the arms of which are loosely connected with the shafts C, and are connected to the lever N by the rods $m$ at opposite side of the fulcrum thereof. The lever N is fulcrumed in a hanger, $n$, and the outer ends are connected by the chain or rod and chain O to the winding-staff P of the brake.

The operation of the device as explained above is as follows: When the car is in motion, the parts are in the position shown in the drawings. If the car be going to the right and it is desired to stop it, the brake-staff P on the front of the car (at the right, as shown) is revolved and the chain O wound up. This draws the brake-wheels D at both ends of the car against the ground-wheels A. The brake-wheels D at the front of the car are prevented from revolving both by the brake-shoes $d$ and the stops $d'$ upon said wheels, which bear against the hangers $c$, which sustain the shaft C, and they therefore act in the same manner a rigid brake-shoe would. The brake-wheels at the rear of the car are revolved by the friction with the revolving ground-wheels. As they revolve they cause the sheaves to revolve and wind up the chain L, which twists or distorts the spring E as the chain is unwound from the sheave G. The opposite sheave G is prevented from revolving by the stops $g$, which strike against the hangers F. As the chain L is moving from the sheave G to the sheave K it revolves the sheave-lever H in the same direction. When the brakes are let off, the force of the spring in regaining its normal position draws the sheave-lever in the opposite direction, when the pawl $h^2$ engages with the ratchet $j$ and revolves the shaft B, and thereby starts the car in the direction it was formerly moving. When moving in the opposite direction the car is stopped by turning the brake-staff at the opposite end of the car, when the parts at opposite ends of the car reverse their action—that is to say, each does the work performed by the other when the car is moving as first above described.

The special advantages of the sheave-lever over the straight lever described in the said Strickle patent is that the power is applied to said lever at nearly all times at right angles thereto, or, in other words, in a tangent to the circle of which the lever is a part. With the straight lever the chain L would at times lie almost in the same direction as the lever, and at such times a large part of the effective force applied to move it in either direction would be lost.

The stops $g$ on the sheaves G, combined with the hangers F, retain one end of the spring E rigid while the other end is revolving, thereby enabling one spring to perform the work for which two are required for a car adapted to move in both directions in the Strickle patented device.

It often happens that a car is stopped from a slow walk, in which case the car would be stopped before sufficient power were stored in the spring to start it. To remedy this objection and insure the starting of the car, we provide an auxiliary winding device, consisting of the following parts, in the form thereof illustrated in the drawings:

R represents a lever fulcrumed in the hanger $r$. To one end is fastened a chain, S, the other end of which is fastened to the lever H, preferably by the same bolt that secures the chain L. This chain S is preferably guided by the pulley T, under which it passes. The other end of the lever has secured to it a chain or rod, U, which is fastened to the chain O some distance back from the brake-staff P. The chain or rod U is taut, normally, while the chain O has, between the lever N and the point where it unites with the chain U, a play of from six to twelve inches, (more or less,) as desired. When, therefore, the chain is wound about the brake-staff P, it draws first on the chain U, which causes the lever H to be drawn back and twist the spring E to a considerable extent. A still further winding applies the brakes D, in the manner and with the results above specified. This auxiliary twisting device, besides insuring the storage of sufficient power in the spring to start the car, prevents the rebound and jar occasioned without it; and the strength of the spring E may be so regulated that with this device no jar at all is experienced. It is found to be quite easy to give this initial distortion to the spring E by the above-described appliance, because, as is evident, the spring twists easily at the start and grows more difficult as the distortion increases. The respective arms of the lever R can be proportioned so as to make it as easy as is necessary.

The stops $d'$ on the brake-wheels D, arranged as they are to engage with the hangers $c$, prevent the jar of the car from shaking the brake-shoes $d$ between the wheels D and the ground-wheels, and thereby prevent the proper working of the device.

Having thus described our invention, what we claim as new, and desire to secure by Letters Patent, is—

1. In a car starter and brake, the combination of the ground-wheels and friction brake-wheels at each end of the car, adapted to be brought in contact with the adjacent ground-wheels and be revolved thereby, a spring and connections between the brake-wheels at opposite ends of the car and opposite ends of the spring, and means for preventing both ends of the spring from revolving at the same time, substantially as and for the purpose set forth.

2. The combination of a torsion-spring and revolving shafts secured to both ends thereof, and the hangers which sustain said shafts, with sheaves keyed to said shafts, having stops adapted to engage with said hangers, and means for twisting said spring by the motion of the ground-wheels, substantially as and for the purpose specified.

3. The combination, with the friction brake-wheels and the ground-wheels of a car, of the hangers which sustain the friction-wheels and stops secured to said friction-wheels and adapted to engage with said hangers, substantially as and for the purpose specified.

4. The combination of the power-accumulator and its shaft, and the friction brake-wheels and shaft and their connections, with a sheave-lever and the ground-wheel axle and ratchet-connection between said two last-named parts, substantially as and for the purpose specified.

5. In a car starter and brake, the combination, with the car-axles and a sheave-lever and ratchet-connection between them, of means for oscillating said sheave-lever by the twisting and untwisting of the power-accumulator, substantially as and for the purpose specified.

6. The combination of a torsion-spring, a shaft secured to each end of said spring, and hangers which sustain said shafts, with means for twisting either end of said spring by the motion of the ground-wheels, substantially as and for the purpose specified.

7. In a car starter and brake, the ground-wheel axles, the collar J, having a ratchet on one end, and an annular groove adjacent thereto, combined with the sheave-lever H and clasps *h*, substantially as and for the purpose specified.

8. In a car starter and brake, a torsion-spring and means for twisting said spring by the revolution of the ground-wheels, combined with an auxiliary twisting device and means for giving an initial distortion to said spring before it is distorted through the instrumentality of the ground-wheels, substantially as and for the purpose specified.

9. In a car starter and brake, the combination of an accumulator and connections with the ground-wheels, an auxiliary power-producing device, and connections with said accumulator, with a winding-staff common to both and connections between said accumulator, auxiliary power-producing device, and winding-staff, substantially as and for the purpose specified.

10. In a car starter and brake, the combination of a torsion-spring, and means for storing therein the power employed to stop the car, with an auxiliary power-producing device, consisting of a lever journaled in a suitable hanger, connections between one end of the lever and the winding-staff, and connections between the other end of the lever and the torsion-spring, whereby the motion of the lever distorts the spring.

FRANK M. MAHAN.
ADAM R. HENDRIX.

Witnesses:
FRANK A. BURRELLE,
JAS. A. DONOVAN.